Patented May 8, 1951

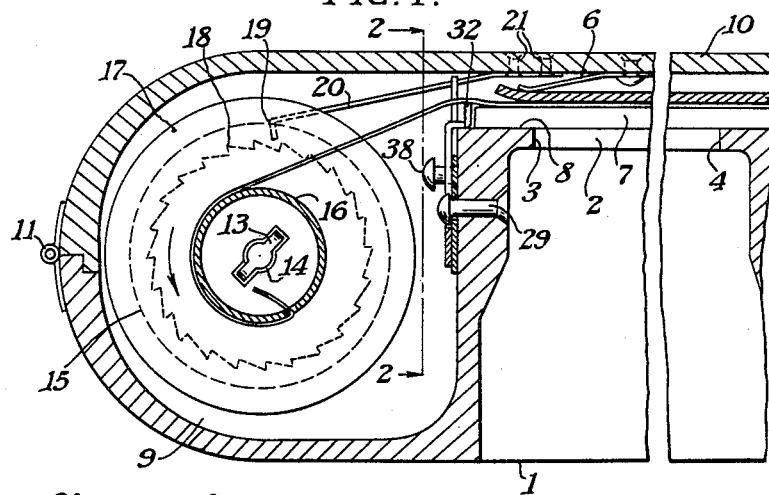

2,552,262

UNITED STATES PATENT OFFICE 2,552,262

FILM-WINDING CONTROL FOR CAMERAS

Edward H. Cumpston, Jr., Rochester, N. Y., assignor to Eastman Kodak Company, Rochester, N. Y., a corporation of New Jersey Application March 12, 1948, Serial No. 14,524

10 Claims. (Cl. 242—71)

This invention relates to a film-winding control for roll-holding cameras. One object of my invention is to provide a means for controlling the winding of an exposure area of film without the use of the exposure numbers on the film backing paper and the window in the camera back. Another object of my invention is to provide a film-winding control which will be automatically retained by the film itself in the proper position to function when a film perforation is wound with the film through a path. Another object of my invention is to provide a film-winding control mechanism which will lie in an inoperative position with respect to the film except during the film-winding operation, thereby permitting the film to lie flat in position for exposures between the winding operations. Still another object of my invention is to provide a film-winding control mechanism which automatically stops the film-winding movement and moves to an inoperative position at the end of a winding movement, and which will then hold the film against winding until manually released after an exposure. A still further object of my invention is to provide a simple type of slip-off latch mechanism for holding the winding mechanism in an operative position and for releasing it from its operative position. Other objects will appear from the following specification, the novel features being particularly pointed out in the claims at the end thereof.

In certain types of roll-holding cameras, film is provided; this film including a perforation for each exposure area. These perforations may be engaged by mechanisms which halt the winding movement when a perforation is reached. Such mechanisms are illustrated in the following patents: U. S. 1,997,332, Green, granted April 9, 1935. U. S. 2,132,680, Crumrine, granted October 11, 1939. These mechanisms have operated satisfactorily when relatively high-grade workmanship has been used in constructing the cameras, but there have been a number of difficulties with such constructions because it has been found that there are some variations in the film cartridges used in these cameras, and that there are also liable to be some variations in mounting the film spools in the camera so that the film and paper does not always pass through exactly the same path. The film perforation engaging members must, of course, lie exactly in the path of the perforation moving across the exposure frame in order to drop into the opening and, since it is desirable to keep the perforation outside of the picture area and to maintain a narrow margin of unexposed film, the size of the perforation cannot very well be enlarged, nor can the size of the perforation-engaging finger be greatly reduced without weakening the construction.

I have found that if a camera is built with the axis of one film spool slightly non-parallel to the axis of the other film spool, even though an attempt is made to guide the lateral edges of the film in the camera, successful operation cannot be obtained with a film-engaging finger passing through a fixed path. If the camera is constructed to accurately guide film where the film spools are not exactly parallel, the film will ride over the guides, will not lie in the proper exposure plane, and will occasionally tear. It is quite difficult to always have the two spool-centering mechanisms exactly parallel and, consequently, I have discovered that by providing an aperture-engaging finger which is floatingly mounted, or which is definitely positioned by the film itself, rather than through its connection to the camera, that the mechanism will operate satisfactorily under widely varying conditions including spool-centering mechanisms which are non-parallel within, of course, certain limits.

I have also found that by providing a film-winding control mechanism which normally lies in an inoperative position with respect to the film with the film-winding shaft latched against movement, that by utilizing this inoperative position in which the film is not engaged by the mechanism for making exposures, the usual pressure pads will hold the film in a satisfactory flat condition while the exposures are being made. In this position there is no pressure on the film tending to move it from the exposure aperture. After an exposure is made and the film is to be wound, the mechanism may be manually moved to an operative position for engaging the film and into a position to engage a film aperture. This movement releases the film-winding shaft. Thus, at the time the mechanism is engaged with the film so that the finger may engage a film aperture, even if the film should be thrust from its focal plane, it is immaterial since it will not disturb the plane of the film during an exposure. As soon as a fresh area of film is wound into place, the mechanism is again moved to an inoperative position away from the film.

Coming now to the drawings wherein like reference characters denote like parts throughout:

Fig. 1 is a fragmentary section through a typical camera showing the film-winding control constructed in accordance with and embodying a preferred form of my invention;

Fig. 2 is a transverse section taken on line 2—2 of Fig. 1;

Fig. 3 is a view similar to Fig. 2 but with the parts in their inoperative position with respect to engaging the film;

Fig. 4 is a fragmentary detailed section through the film-winding control mechanism in its inoperative position with respect to engaging film; and Fig. 5 is a fragmentary perspective view with the film-engaging finger in an operative position.

A camera for utilizing my improved film-winding control may be similar in general contour, if desired, to the camera shown in the patents to Green and Crumrine above mentioned. As shown in Fig. 1, the camera may consist of a camera body 1 having an exposure frame 2 with end walls 3 and 4 on the exposure frame and a presser member 5 for holding the film flat. This presser member may be held by springs 6 so as to press a film F over the exposure frame 2. Side rails 7 on each side of the exposure frame support the film F, the end rails 8 being somewhat lower than the side rails, so as not to contact with the exposure area of the film F.

The camera 1 may have a take-up chamber 9 and there may be the usual camera back 10 hinged at 11 to the camera body. The take-up chamber 9 may be provided with any suitable type of film-centering mechanism which includes a film-winding key 13 at one end, this film-winding key having a shaft 14 which may be turned by a winding knob 15 in the usual manner to rotate a hub 16 of a film spool including spaced flanges 17.

The winding shaft 14 may have affixed thereto a ratchet 18. This ratchet lies in the path of a pawl 19 which pawl may be carried on the end of a long arm 20 which may be attached to the camera back 10 as by rivets 21. In the present instance, I prefer to make the long arm 20 a spring arm which will thrust the pawl 19 normally into contact with the ratchet 18. Of course, if desired, the pawl 20 may be pivoted and may be thrust into contact with the ratchet by means of a separate spring. In any event, the pawl 20 normally holds the film-winding knob 15 against movement and remains in this position while a picture is being made.

After a picture is made, and the operator is ready to wind a fresh area of film into place, the pawl 20 must, of course, be moved from its latching position to a non-latching position, as shown in Fig. 1. This can be accomplished by depressing a push button 25, best shown in Fig. 2. This push button passes through a suitable bearing 26 in the camera back 10 and engages a shoulder 27 on a carrier 28. This carrier has a lost motion connection with the camera body 1. In this instance, the lost motion connection may consist of a stud 29 passing loosely through a slot 30 so that the connecting bar 28 may both turn about the stud 29 and may slide relative to it. On the opposite side of the connector 28 there is a second shoulder 31; this shoulder engaging the long arm 20 of the spring pawl. Consequently, when the button 25 is depressed, the connector turns about the pivot 29, raising the pawl 20 to its Fig. 1 position. In doing this, the connector also moves the film aperture-engaging finger 32 from its inoperative position of Fig. 3 to its operative position in Fig. 2. The finger 32, in the present instance, has the form shown in Fig. 5 in that the finger 32 is bent upwardly from a shoulder portion 33 which provides a slip-off latch element, after which the metal is formed downwardly at 34 and transversely at 35, being preferably attached to the carrier 28 as by means of rivets 36. This member is preferably made of spring metal and an aperture 37, surrounding a stud 38, permits this spring member to move in the direction guided by the stud and aperture relative to the carrier 28. The reason for this is as follows.

With the parts in their Fig. 3 position, when the operator depresses the button 25, thus raising the shoulder 31 to move the pawl 19 from the ratchet 18, the carrier 20 moves the finger 32 upwardly until the latch element 33 snaps over the shoulder portion 40 which constitutes a second latch element carried by the camera body. Thus, as soon as the carrier 28 moves a sufficient distance, the latch elements 33 and 40 become engaged and the finger 32 projects into the path of a film aperture A, which path will be formed by the winding knob moving the film across the exposure aperture 2.

In order to correct for misalignment of the film, relative to the exposure aperture 2, for any causes, such, for instance, as misalignment of the film spools, the carrier 28 is made so that it will accurately guide the finger 32 laterally as the film may move laterally so that regardless of the position of the film, the finger 32 will always be accurately aligned with the path of the film aperture A. To do this, the carrier 28 is provided with a pair of upstanding arms 41 and 42 which are so arranged that they will project a material distance past the lateral edges $F^1$ and $F^2$ of the film. These arms are spaced a distance slightly greater than the maximum width of the film F so that if the film moves transversely of the camera body for any cause, the latching finger 32 will be simultaneously moved and it will always remain in the path of the film aperture A so that it cannot possibly ride on the film while the aperture A moves past the finger without having the finger engaged by the film.

The winding position is shown in Fig. 2 and, as indicated in this figure, during the winding movement the edge portion $F^2$ of the film may curl slightly upward, since it engages the top of the finger 32. Consequently, when the aperture A reaches the finger 32, it will snap down over the finger and continued winding movement will cause the finger to move so that it will snap off the camera body and the snap-latch elements 33 and 40 will be released. As soon as this occurs, the carrier 28 may rock on its stud 29 under the influence of the spring arm 20, thereby engaging the pawl 19 with the ratchet 18 and halting the winding movement. Thus, the Fig. 3 position of the parts will be reached, the knob 25 will be moved outwardly, and the finger 32 will be moved downwardly, so that the film F may again lie flat on the rails 7 of the exposure frame 2. In this position the surface of the film itself is not in contact with any part of the film-winding control mechanism and, consequently, there is nothing to hold the film away from its plane position for exposure.

It will be seen from the above description that I have provided a film-winding control mechanism which normally lies out of engagement, particularly with the emulsion side E of a film F, while the film lies in a plane and is ready for exposure. The usual film-holding pad 5 is therefore entirely satisfactory for holding the film in its exposure plane. However, when a film exposure is to be wound, the push button 25 is depressed, thus thrusting the film-engaging mechanism up against the film so that a film perforation will cause the finger to snap off its snap latch element on the camera body, thereby permitting the mechanism to be moved away from engagement with the film and permitting the spring pawl to engage the ratchet to stop the winding mechanism. During all of the movement of the film, the latching finger is guided so as to remain accurately in the path of the film aperture, and should the film weave from side-to-side in winding, the latching finger would weave with it; or, if the film passes accurately through a straight path, the latching finger will, of course, remain accurately in the path of the film aperture A, because the carrier is moved by the lateral edges of the film $F^1$ and $F^2$ through the arms 41 and 42, should any movement of the carrier be required for the particular camera or for the particular film being wound through the camera. Thus, the proper engagement of the film-winding control finger and the film aperture are definitely insured.

I claim:

1. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and movable carrier for controlling the movement of the pawl, said movable carrier including a finger adapted to enter a film perforation and arms supported by the movable carrier and engageable by the film for guiding said finger into the path of perforations carried by the film and moved through a path by the winding shaft.

2. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation and a movably mounted carrier therefor including a pair of spaced arms, one extending past each lateral edge of the film to be moved by the film as the film may move laterally when moved by the winding shaft.

3. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation and a movably mounted carrier therefor including a pair of spaced arms, one extending past each lateral edge of the film to be moved by the film as the film may move laterally when moved by the winding shaft, and a lost motion connection between the camera body and carrier on which said carrier may both turn and slide.

4. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation and a movably mounted carrier therefor including a pair of spaced arms, one extending past each lateral edge of the film to be moved by the film as the film may move laterally when moved by the winding shaft, and a lost motion connection between the camera body and carrier on which said carrier may both turn and slide, a manually operable button for turning the carrier in one direction, and operable connections between the carrier and pawl for moving the latter by the former when the manually operable button is operated thereby moving the pawl from the ratchet.

5. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation and a movable carrier engageable by the film for guiding said finger into the path of perforations carried by the film, a latch element on the finger, a latch element on the camera, the latch elements when engaged holding the finger in the path of a film perforation, and a slip-off connection between the latch elements so that a film perforation by moving the latch element carried by the finger from the latch element carried by the camera may cause the former to slip off the latter whereby the carrier may turn said finger latch element to an inoperative position with respect to the camera latch element.

6. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation, means for movably supporting the finger, said finger and camera body including snap latch elements positoned when engaged to hold the finger in the path of a film aperture, and, when the aperture moves the finger to cause the snap latch elements to slip off, the finger may lie spaced from the path of the film.

7. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation, means for movably supporting the finger, said finger and camera body including snap latch elements positioned when engaged to hold the finger in the path of a film aperture, and, when the aperture moves the finger to cause the snap latch elements to slip off, the finger may lie spaced from the path of the film, the spring impelled pawl moving the finger from its film aperture engaging position.

8. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation, means for movably supporting the finger, said finger and camera body including snap latch elements positioned when engaged to hold the finger in the path of a film aperture, and, when the aperture moves the finger to cause the snap latch elements to slip off, the finger may lie spaced from the path of the film, the spring impelled pawl moving the finger from its film aperture engaging position, and a manually operable pawl release member for releasing the pawl and simultaneously moving the finger to its aperture engaging position.

9. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a finger adapted to enter a film perforation, means for movably supporting the finger, said finger and camera body including snap latch elements positioned when engaged to hold the finger in the path of a film aperture, and, when the aperture moves the finger to cause the snap latch elements to slip off, the finger may lie spaced from the path of the film, and means for guiding the means for supporting the finger to move laterally with the film.

10. Film winding control for roll holding cameras utilizing perforated film and including a camera body, exposure frame, and a take-up chamber with a winding shaft therein, said film winding control comprising a ratchet wheel affixed to the winding shaft, a pawl spring impelled into contact with the ratchet, and mechanism for controlling the movement of the pawl, said mechanism including a spring finger, a shoulder on the spring finger, a carrier supporting the spring finger and including arms embracing lateral edges of a film, a mount carried by the camera on which the carrier may slide and turn, a pair of shoulders adjacent the arms on the carrier, one shoulder engaging the spring impelled pawl, a push button engaging the other shoulder, a shoulder on the camera body lying in the path of the shoulder on the spring finger to form a snap latch therewith adapted to hold the spring finger in a film aperture engaging position, the film aperture moving the spring finger to a position to snap off the shoulder on the camera body and into an inoperative position with respect to the film, and in which the pawl engages the ratchet, the spring impelled pawl tending to turn the carrier in one direction and the push button when depressed turning the carrier in an opposite direction.

EDWARD H. CUMPSTON, Jr.

REFERENCES CITED

The following references are of record in the file of this patent:

UNITED STATES PATENTS

| Number | Name | Date |
|---|---|---|
| 1,997,332 | Green | Apr. 9, 1935 |
| 2,132,680 | Crumrine | Oct. 11, 1938 |